United States Patent [19]

Viescou

[11] 3,871,918

[45] Mar. 18, 1975

[54] NEGATIVE ELECTRODE FOR ELECTROCHEMICAL GENERATOR

[75] Inventor: Claude Viescou, Epinay Sur Seine, France

[73] Assignee: Compagnie Industrielle Des Piles Electriques "Cipel", Levallois-Perret, France

[22] Filed: May 29, 1973

[21] Appl. No.: 364,273

[30] Foreign Application Priority Data
May 30, 1972 France .............................. 72.19352

[52] U.S. Cl. .................................. 136/30, 136/157
[51] Int. Cl. .......................................... H01m 43/00
[58] Field of Search .............................. 136/30–31, 136/157–158, 27, 161, 125–126, 6 R, 95, 102, 34–35, 75–76; 252/315–317

[56] References Cited
UNITED STATES PATENTS

| 2,593,893 | 4/1952 | King | 136/107 |
| 2,938,064 | 5/1960 | Kordesch | 136/125 X |
| 3,056,849 | 10/1962 | Warren et al. | 136/125 X |
| 3,207,633 | 9/1965 | Meltzer et al. | 136/158 X |
| 3,335,031 | 8/1967 | Kordesch | 136/30 X |
| 3,451,851 | 6/1969 | Stanimirovitch | 136/30 |
| 3,586,539 | 6/1971 | Lauck | 136/157 X |

Primary Examiner—Anthony Skapars
Attorney, Agent, or Firm—Kenyon & Kenyon Reilly Carr & Chapin

[57] ABSTRACT

Electrochemical storage cell embodying a novel negative electrode of zinc powder grains suspended in a three-dimensional gel constituted by a polymerizing reaction product of acrylamide, acrylic acid and methylenebisacrylamide, a novel polymer type electrolyte for said cell, method of preparing said negative electrode and said electrolyte, and method for producing said cell are described.

12 Claims, 3 Drawing Figures

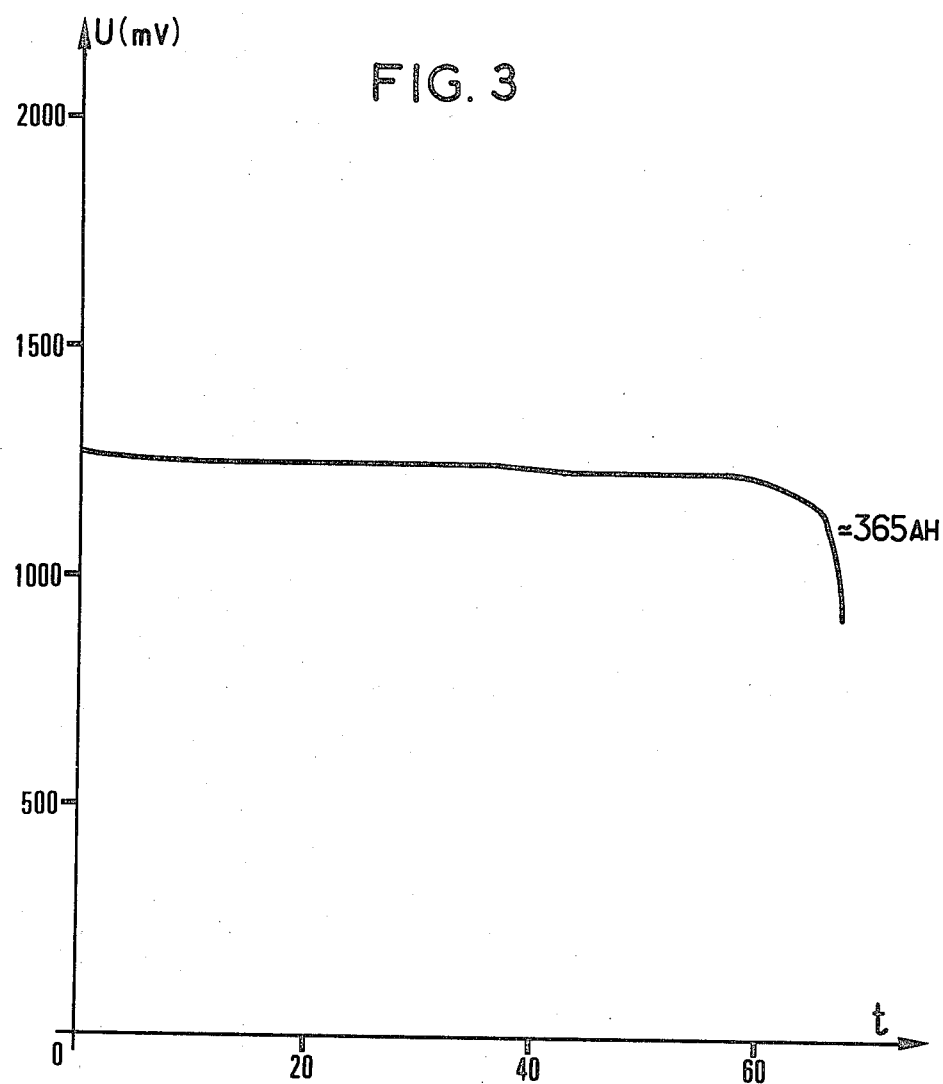

NEGATIVE ELECTRODE FOR ELECTROCHEMICAL GENERATOR

RELATED APPLICATIONS

No related applications of applicant are copending.

BACKGROUND OF INVENTION AND SUMMARY OF INVENTION

The present invention concerns improvements made to a negative electrode consisting mainly of zinc powder in the form of a suspension in a gel.

It also concerns electrochemical cells comprising such negative electrodes and more particularly air depolarisation cells.

It is a known practice to produce electrodes made of zinc powder in the form of a suspension in a gel. The gels used are constituted by the electrolyte and a gelling agent in the form of a linear chain such as starch, compounds of carboxymethyl cellulose, etc. The grains of zinc are maintained therein due to the viscosity of the medium, but are liable to move under the effect of a field produced, for example, by gravity, acceleration forces and centrifugal forces. A sedimentation phenomenon having the effect of modifying the original composition of the suspension and thus of causing more or less great disturbances in the electrochemical operation of the corresponding electrodes is then observed. This defect becomes particularly serious for suspensions in which the active negative substance is very porous, the gelled electrolyte entering in the pores. In that case, a certain settling down or a modification of the structure formed by the zinc particles occurs, that structure developing into configurations which are less and less porous. Now, it happens that the active zinc substance working in a substantially insoluble way, this being the case when certain special electrolytes or alkaline electrolytes saturated with zincate are used, increases in volume during its discharge. This increase in volume is in the order of 60 percent. If the original porosity of the electrode is insufficient to allow that increase in volume, the negative electrode will either generate thrusts which are all the greater as the original porosity is smaller, or become blocked in the electrochemical discharge process.

It was thought that this defect would be overcome by providing an expansion volume for the active material of the negative electrode. Although that solution has constituted a progress, there are cases in which the mass movement of the active negative substance requires particular implementing, hence a certain complication in the construction.

An attempt has also been made to produce very porous original suspensions with zinc powder, but that attempt resulted in failure because of sedimentation phenomena: Thus, in zones where a sediment has been formed, the original problem arose again, whereas the other zones became abnormally poor in zinc.

The present invention has for its object a negative electrode consisting mainly of zinc powder in the form of a suspension in a gel, characterized in that the grains of zinc are contained and retained in a gel of the three-dimensional type constituted by a polymerizing reaction product of acrylamide, acrylic acid and methylenebisacrylamide.

It is indeed observed unexpectedly that it is possible to produce negative electrodes having a stable space configuration with grains of zinc, not giving rise to sedimentation or to a development of a less and less porous space configuration, using a gelling agent of the three-dimensional type.

It is also observed unexpectedly that when negative electrodes having a stable space configuration are produced by means of a gelling agent of the three-dimensional type, they operate, when discharging, in a satisfactory way even if they are very porous. Thus, such electrodes formed with 20 percent by volume of zinc and 80 percent of gelled electrolyte operated, in discharge, up to 90 percent of faradic output.

This latter result, which is very unexpected because the grains of zinc are not contiguous, may be explained as follows. The grains of zinc in direct contact with the collector discharge by becoming oxidized and increase in volume by generating a zinc oxide having electronic conductivity. These grains of zinc oxide touch the neighbouring grains of zinc which, in their turn, discharge, becoming oxidized and increasing in volume, thus, progressively. That progression of the discharge is due to the fact that the grains of zinc are in a space configuration whose stability is maintained by means of the three-dimensional gel which prevents their sedimentation. Should this sedimentation occur, there would be zones where even the oxidized grains of zinc would not be contiguous, so that the progression of the gradual discharge would be unable to take place.

According to one particularity of the invention, the original configuration of the grains of zinc in such a gel of the three-dimensional type constituting the negative electrode is such that the grains of zinc are not contiguous, on the whole, when the electrode is in the charged state and that they become contiguous as the discharge of the said electrode progresses.

The final porosity of the electrode in the discharged state may, to great advantage, be comprised between 25 and 80 percent and the original porosity of the electrode in the charged state may be greater than 50 percent and even reach 85 percent.

The negative electrode according to the present invention is a particular advantage for producing an electrochemical cell. The active substance of the positive electrode of that generator may be constituted by higher nickel oxides or by silver oxides. That positive electrode may also be an electrode for ionising the oxygen, constituted by a conductive support provided with suitable catalysts.

According to the invention, the electrolyte placed between the electrodes may be either a liquid electrolyte or an electrolyte fixed in a porous body such as a felted fabric. It may be in the form of a gel which is different from the three-dimensional gel of the negative electrode. That gel could be constituted by an electrolyte gelled by grains of starch which are swollen but have not burst. It could also be of the same type as the three-dimensional gel of the electrode.

That electrolyte may be constituted by a potassium hydroxide solution which is advantageously saturated with zincate.

In order to understand properly the physical significance of the limits of porosity which have just been mentioned, it is sufficient to refer to the treatise by ERICH MANEGOLD (KAPILLAR-SYSTEME, volume 1, HEIDELBERG 1955, page 234 and the following pages) in which the various stable and unstable configurations (see page 242) obtained from spheres are described. Thus, in the most porous configuration formed by chains of 6 contiguous spheres arranged on a circumference, the filling coefficient is in the order of 22 percent and the corresponding porosity is in the order of 78 percent. The most dense configuration corresponds to a contiguous arrangement of the tetrahedral type in which the filling coefficient is 74 percent and the corresponding porosity is in the order of 26 percent. An intermediate configuration corresponding to a piling up of spheres in tangential contact with one another and whose centers are distributed along the three axes which are orthogonal to one another has a filling coefficient of 52 percent and a porosity of about 48 percent.

This data may be transposed to other types of zinc particles. What has been sought, in order to comply with one aspect of the present invention, is to produce practical conditions for obtaining a final configuration with contiguous grains of zinc oxide. It has been observed that, to produce the first and most porous configuration described above, it is compulsory to start with an original porosity of about 86 percent obtained with zinc particles, in order to end with a final porosity of 78 percent. Thus the configuration which is the most dense in zinc oxide (final porosity about 26 percent) corresponds to an original porosity of 54 percent. Inasmuch as concerns the intermediate configuration giving, so to speak, an average value of the limits, to obtain the final zinc oxide configuration corresponding to a porosity of 48 percent, it would be necessary to start with an original porosity of about 68 percent of zinc particles.

The limits thus defined are found to be practically the same for other shapes of zinc particles. Thus, it has been observed that a negative electrode having an original porosity of 80 percent actually discharges with a faradic efficiency of about 90 percent this prouving that the phenomenon of a discharge taking place by degrees actually occurs within the mentioned limits of original porosity of the electrodes.

Other characteristics of the invention will become apparent from the following description and from the accompanying drawing, in which:

FIG. 3 shows the discharge curve of a cell comprising a negative electrode according to the invention.

Figure 1:
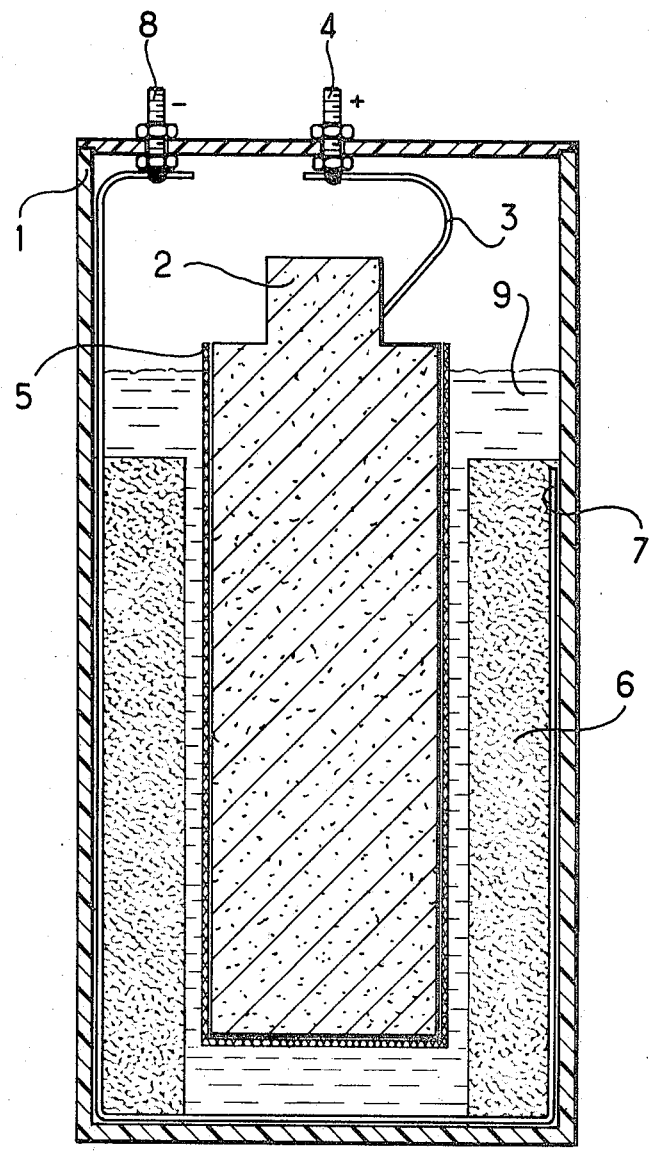
FIG. 1 shows a diagrammatic cross-section of an embodiment of an alkaline cell according to the invention.

In FIG. 1, reference numeral 1 designates a cylindrical casing made of a synthetic material and about 15 cm high. The central part of the inside of the casing 1 is taken by a positive electrode 2, having a generally cylindrical shape and made of agglomerated active carbon, capable of reducing oxygen by an electrocatalytic process.

The electrode 2 is connected by a metallic wire 3 to a positive terminal 4 arranged on the upper part of the cell and is surrounded by a separator 5 made of a fibrous synthetic material. The lateral wall of the casing 1 is in contact with a zinc powder negative electrode 6 in which a metallic wire 7 connected to a negative terminal 8 placed at the upper part of the storage cell is embedded. The porosity of the zinc powder in the electrode 6 is greater than 50 percent and may reach 80 percent. An immobilized electrolyte 9 fills the space situated between the separator 5 and the negative electrode 6 and in the pores of the separator 5 and covers the negative electrode.

By way of an example, the negative electrode 6 may be obtained as will be described.

The following products are mixed in the order given hereunder:

56 ml of a KOH 9 N solution containing 40 g/l of zinc oxide;
6.28 ml of a 50 percent acrylamide solution;
6.28 ml of a 50 percent acrylic acid solution;
28 ml of a 2 percent methylenebisacrylamide solution;
1 ml of a 50 percent ammonium persulphate solution;
0.5 ml of $\beta$-dimethylaminopropionitrile.

Due to the effect of ammonium persulphate as a catalyst and of $\beta$-dimethylaminopropionitrile as an accelerator, acrylamide, acrylic acid and methylenebisacrylamide copolymerize to form a three-dimensional reticulated acrylic polymer. This polymer is in the form of hydrophilic gel which immobilizes the KOH solution.

After 3 minutes of polymerization, 75 ml of gel are crushed with 78 g of zinc powder and 2 g of red mercury oxide and the mixture is stirred to make it homogeneous and it is then placed in the casing 1 to form the negative electrode 6.

The zinc particles of electrode 6, amalgamated at the surface by reduction of mercury oxide, are retained by the three-dimensional acrylic gel and do not settle down.

The electrolyte 9 is an alkaline gel obtained in the same way as the gel of the negative electrode, but its composition may be different. More particularly, the concentration of the original KOH solution may be comprised between 5 and 7 N. The mixture is immediately poured between the electrodes and above the negative electrode and is polymerized in situ.

Figure 2:
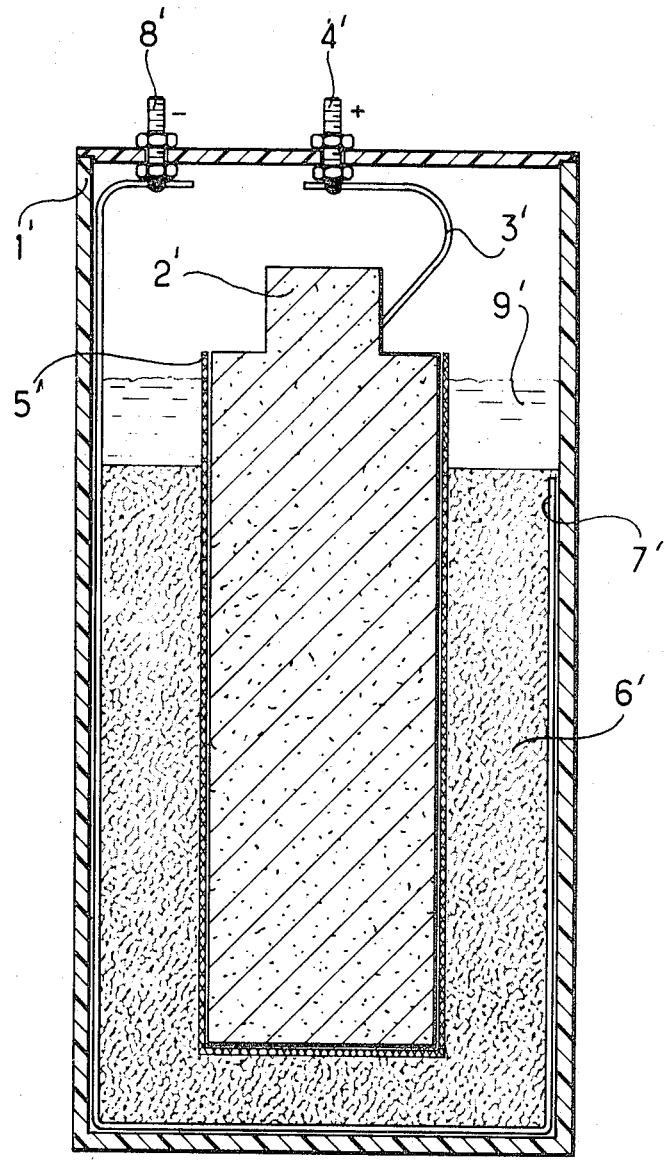
FIG. 2 shows a diagrammatic cross-section of another embodiment of an alkaline cell according to the invention.

In FIG. 2, the same references as in FIG. 1 are used to designate the same parts. The cell shown in FIG. 2 differs from the preceding cell only in that the space between the electrodes 2 and 6 is reduced to the thickness of the separator 5, the electrolyte 9 being situated only in the pores of the separator and above the negative electrode 6. During the manufacturing of that cell, the positive electrode 2 surrounded by the separator 5 is pushed into the negative electrode and the electrolyte 9 is poured over the electrode 6 before the polymerization of the gel contained therein.

FIG. 3 shows the discharge curve of a cell comprising a negative electrode according to the invention in which the discharge time in days is plotted in the abscissa and the voltage in millivolts is plotted in the ordinate.

This cell is of the air depolarization type. It has a prismatic shape with dimensions of 85 × 85 × 180 mm.

The porosity of the zinc electrode is 70 percent and discharge is effected through a 5 ohm resistor.

What is claimed is:

1. Negative electrode for an electrochemical cell whose active material mainly consists of zinc powder in the form of a suspension in a gel, characterized in that the zinc particles are contained and retained in a three-dimensional gel and maintained therein in a stable space configuration, the three-dimensional gel being constituted by a polymerizing reaction product of acrylamide, acrylic acid and methylenebisacrylamide, said gel containing an electrolyte consisting of potassium hydroxide solution.

2. Negative electrode according to claim 1, characterized in that the zinc particles are not contiguous, in the whole, when the electrode is in the charged state and in that they become contiguous as the discharge of the said electrode progresses.

3. Negative electrode according to claim 1, characterized in that the potassium hydroxide solution is saturated with zincate.

4. Negative electrode according to claim 1, characterized in that the final porosity of the electrode in the discharged state is comprised between about 25 and about 80 percent.

5. Negative electrode according to claim 1, characterized in that the original porosity of the electrode in the charged state is greater than 50 percent.

6. Negative electrode according to claim 1, characterized in that the zinc particles are amalgamated.

7. Electrochemical cell comprising a positive electrode, a negative electrode consisting of zinc particles as a suspension in a gel, and wherein said zinc particles are contained and retained in said gel in stable spaced configuration, said gel being of three-dimensional type constituted by a polymerizing reaction product of acrylamide, acrylic acid and methylenebisacrylamide, a porous separator and KOH electrolyte located between the said electrodes and in the pores of said porous separator.

8. Electrochemical cell according to claim 7, characterized in that the said electrolyte located between electrodes and in the pores of said porous separator is constituted by a potassium hydroxide solution.

9. Electrochemical cell according to claim 8, characterized in that the potassium hydroxide solution is saturated with zincate.

10. Electrochemical cell according to claim 8, characterized in that the electrolyte located between the electrodes is immobilized in said porous separator.

11. Electrochemical cell according to claim 8, characterized in that the electrolyte located between the electrodes and in the pores of the said separator is in the form of a gel.

12. Electrochemical cell according to claim 8, characterized in that the electrolyte located between the electrodes is also in the form of a three-dimensional type gel constituted by a polymerizing reaction product of acrylamide, acrylic acid and methylenebisacrylamide that gels said postassium hydroxide solution.

* * * * *